(12) United States Patent
Nagineni et al.

(10) Patent No.: US 7,668,981 B1
(45) Date of Patent: Feb. 23, 2010

(54) STORAGE PATHS (75) Inventors: Venkata Sreenivasa Rao Nagineni, Pune (IN); Siddhartha Nandi, Pune (IN); Ameya P. Usgaonkar, Pune (IN); Hari Krishna Vemuri, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 63 days.

(21) Appl. No.: 11/729,178

(22) Filed: Mar. 28, 2007

(51) Int. Cl.
*G06F 3/00* (2006.01)
(52) U.S. Cl. .............................. 710/38; 710/15; 710/29; 710/33; 710/36; 710/40
(58) Field of Classification Search .................. 710/15, 710/29, 33, 36, 38, 40, 46
See application file for complete search history.

(56) References Cited

U.S. PATENT DOCUMENTS 6,145,028 A * 11/2000 Shank et al. .................. 710/31
7,451,252 B2 * 11/2008 Rooney et al. ................ 710/38
7,519,744 B2 * 4/2009 Hayashi et al. ............... 710/21
2003/0088529 A1 * 5/2003 Klinker et al. ................. 706/3
2008/0126857 A1 * 5/2008 Basham et al. ................ 714/25

* cited by examiner

*Primary Examiner*—Tariq Hafiz
*Assistant Examiner*—Jasjit S Vidwan
(74) *Attorney, Agent, or Firm*—Meyertons, Hood, Kivlin, Kowart & Goetzel, P.C.

(57) ABSTRACT

A method for controlling data traffic within a storage area network can be provided. The method can comprise analyzing data for a path in a storage area network to determine whether the path should be identified as a less preferred path, and controlling data traffic routing to avoid use of a path identified as a less preferred path. In some embodiments, the data can be obtained from a host bus adaptor in the path. In some embodiments, the controlling can comprise throttling traffic over a path identified as a less preferred path.

20 Claims, 6 Drawing Sheets

STORAGE PATHS

INTRODUCTION

The present invention relates to storage paths and in particular but not exclusively to monitoring traffic paths within a storage environment and avoiding the use of low performing paths.

BACKGROUND

The introduction of storage area networks (SANs) has dramatically changed the complexity of path management components. The number of devices that can be connected to a host has increased by an order of two. Similarly, the number of paths to any given storage element has gone up by a factor of two or so. The larger number of paths and devices, spanning a much larger area, has increased failure probability of the hardware components in the path from the application to the storage.

The kinds of path errors encountered in a storage area network environment are rather different to those found in, for example, direct attached storage environments. Many storage area networks incorporate a dynamic multi-pathing type routing arrangement where traffic is shared between all available paths between endpoints. One path error which can be particularly difficult to address in a storage area network environment is the intermittent hardware failure. This leads to repeated invocation of 'error handling procedures' of a dynamic multi-pathing system which in turn causes degradation of performance. The performance degrades proportional to the frequency of the switching of the hardware component(s) between failed and healthy states. Sometimes the performance degradation can become so severe as to make the entire system completely unusable.

As SANs have become the de-facto configurations of storage industry, a large number of different hardware vendors have provided products suitable for use in such an environment. Whilst this provides significant consumer choice, it can lead to very high heterogeneity within a given SAN environment. Disk arrays from a variety of vendors coupled with various SAN switches from different vendors increase the heterogeneity of the network. Further, the heterogeneous hardware usually does not comply with a common standard and simply increases the interdependency and the complexity of the entire configuration.

Given this situation, the host software has very limited knowledge of the complex network and therefore, the host software performs poorly when the configuration is destabilized even transiently, for example by an intermittent hardware failure or by reconfiguration of the SAN topology. The result of this sporadic destabilization is detrimental and results in downgraded application throughput due to delayed detection and delay in subsequent recovery.

The throttling mechanisms that exist in I/O subsystems of devices typically connected within a SAN are inactive type mechanisms. The throttling is directly dependent on the queue maintained by the device and therefore, throttling will not happen from device driver until the need for throttling is reported by the device. Also, the throttling kicks in only when the error is reported by the SAN as packets are lost. A typical conventional I/O subsystem directly relies on the device queue maintained by the target device. When the device is swamped with I/O requests, the queue goes full and the device drops the requests. The device driver observes I/O timeout and throttles the requests to the device. This has been the approach in the standard SCSI (small computer system interface) driver for a long time, but the technique is inefficient as there is flooding at the I/O subsystem until the queue-full condition is reported by the device. Thus it is clear that such inactive techniques cannot prevent the flooding of I/O subsystems or the SAN and therefore, these known techniques cannot ensure quick recovery following destabilization of the SAN.

Certain techniques that relate to network performance issues have been presented in the following publications.

"Creating Performance-based SAN SLAs Using Finisar's NetWisdom", a corporate whitepaper published in 2006 by Finisar Corporation of Sunnyvale, Calif. describes a system whereby a service level agreement for a SAN based on performance as well as uptime/availability statistics. The document suggests using metrics such as exchange completion time and queue depth to measure performance in context of creating and assessing a service level agreement.

"NetWare Cluster Services: The Gory details of Heartbeats, Split Brains and Poison Pills", document ID 10053882, dated 18 Feb. 2003, by Novell, Inc. of Waltham, Mass. sets out information related to Novell NetWare Cluster Services clusters. The document suggests using LAN (local area network) driver and protocol stack statistics to determine whether a bad NIC (network interface controller) is intermittently dropping packets and thereby causing a split brain condition in a clustered NetWare environment.

"Defending Against Distributed Denial-of-Service Attacks with Max-Min Fair Service-Centric Router Throttles", Yau, D. K. Y. et al, IEEE/ACM Trans. On Networking, Vol. 13, No. 1, February 2005, pages 29-42 describes a mechanism to throttle packets at router by monitoring the incoming traffic rate and to identify the IP address of the sender/receiver. This proposed technique for defending IP based networks against distributed denial of service (DDoS) attacks causes throttling to be triggered when the router is swamped with packets.

"Scalability of Reliable Group Communication Using Overlays", Baccelli, F. et al, presented at IEEE Infocom, Hong Kong, 7-11 Mar. 2004, describes a throttling mechanism related to IP based networks.

The present invention has been made, at least in part, in consideration of drawbacks and limitations of conventional systems.

SUMMARY

A method for controlling data traffic within a storage area network can be provided. The method can comprise analyzing statistical data for a path in a storage area network to determine whether the path should be identified as throttled or a less preferred path, and controlling data traffic routing to avoid use of a path identified as throttled or a less preferred path. In some embodiments, the statistical data can be obtained from a host bus adaptor in the path or the data can be gathered dynamically from a multipathing controller or driver, such as a DMP controller or driver, as data traffic is routed through the paths. In either case, the data traffic can be diverted to preferred paths once a throttled or less preferred status is detected.

Embodiments of the present invention can perform detection of unstable paths from transport fabric statistics and thereby allow a system to avoid underperforming paths though the fabric when routing traffic thereto. Also, embodiments of the present invention allows a system to perform proactive anticipatory I/O throttling mechanisms to control performance degradation during instability events and to expedite the subsequent recovery by diverting the I/O service requests through unaffected areas.

From another point of view, the present invention may be seen as allowing the leveraging of SAN traffic statistics as predictors of the health of paths, and allowing remedial action to be taken to avoid use of unhealthy paths.

As has been noted above, it is far from uncommon in SAN environments to experience intermittent hardware failures. These can lead to repeated invocation of error handling and consequential loss of performance proportional to the frequency of the switching of the hardware components between failed and healthy states. To avoid this problem, the present invention uses fabric traffic statistics to track numbers of lost packets etc., so as to identify and/or predict intermittently failing paths. The traffic statistics can be collected by any appropriate monitoring interface for the fabric. By analyzing the traffic statistics, a routing controller within a dynamic multipathing SAN based can avoid using those paths for traffic.

SAN events such as fibrechannel link disconnection can introduce instability into the system. The host multipathing software may be oblivious of the instability until the fact is reported by underlying subsystem in the form of I/O errors. The software, however, continues to pump down I/O requests to the subsystem until that time which results in slow recovery.

Embodiments of the present invention can attempt to anticipate the occurrence of instability caused by SAN events such as fibrechannel link disconnection, thereby discovering errors prior to high-level host multipathing software which may be oblivious of the instability until the fact is reported by underlying subsystem in the form of I/O errors, which host multipathing software may continue to pump down I/O requests to the subsystem until that time which can slow recovery. Embodiments of the present invention can also attempt to throttle the data traffic to the affected paths and control the damage and performance degradation resulting from the instability thereby speeding up the recovery.

Host based software can start recovery when an error has been detected. However, the time taken by the recovery process can be abnormally high if the I/O subsystem is busy. Enterprise configurations running I/O intensive real time applications such as stock trading or online fund transfer applications mandate that the stoppage (the downtime) be minimum in the case of an error. If the host based software were to rely on the I/O subsystem interface drivers to notify it of error conditions, then the recovery process would be delayed owing to reasons described previously. For recovery to be fast the damage should be minimum, and the present invention realizes and exploits the fact that the damage can be minimized or prevented by throttling the affected areas from the damaging entities until recovery is done.

There has, therefore, been developed a system and method to proactively anticipate a possible unstable condition in the SAN by monitoring the response times of the I/O requests, and speed up the subsequent recovery by re-routing the packets through unaffected parts of the SAN.

Embodiments of the present invention can monitor the I/O response proactively and set off a trigger in anticipation, when the response slows down, even before the condition is reported by the underlying I/O subsystem or the SAN. Because the affected I/O subsystem or the SAN is prevented from getting swamped with I/O requests, the recovery is fast.

Viewed from one aspect, the present invention can provide a method for routing data traffic between a server and a storage device in a storage area network. The method can comprise analyzing statistical records of data traffic passing over first and second paths between a server and a storage device in a storage area network to determine whether either of the first path or the second path should be identified as a less preferred path. The statistical records can be sourced from either of a host bus adapter or a multipathing driver. Further, data traffic routing can be controlled to avoid use of a path identified as a less preferred path.

By use of the present invention a number of advantages can be realized. Intermittent hardware failures caused by faulty or removed hardware within a storage area network can be compensated for by re-routing data traffic over a part of a storage area network unaffected by the failures. Furthermore, destabilizations of a storage area network, whether transient or permanent, can be detected by monitoring data traffic behavior so as to pre-empt a possible unstable or failure condition and re-route data traffic by an alternative route.

Viewed from some aspects, the present invention aims to avoid paths that may be negatively influenced by SAN events. This may be achieved by using statistics on the performance and/or behavior of the SAN. Such performance and/or behavior statistics can be obtained direct from the hardware level from host bus adapters in the SAN or can be obtained from systems level drivers including a path selection driver or a data transport driver. In some aspects, the invention can detect affected paths from host bus adapter sourced data and use that information to remove paths from active service. In some aspects, the invention can implicitly detect affected paths from driver information and reduce traffic to those paths.

Further aspects and embodiments of the invention will become apparent from the following description of various specific examples.

BRIEF DESCRIPTION OF THE FIGURES

Particular embodiments of the present invention will now be described, by way of example only, with reference to the accompanying drawings in which like parts are identified by like reference numerals.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

SPECIFIC DESCRIPTION

In the following discussion, reference will be made to I/O traffic in a dynamic multipathing storage area network implementing virtualized storage. As such systems work on the basis of logical addressing abstracted from any filesystem implemented over the virtualized storage, reference will be made to block I/O type transfers and I/O traffic. It will be understood by the skilled reader however, that the techniques described herein are equally applicable to a non-virtualized storage environment, and so references to block I/O type transfers and I/O traffic are equally applicable to any form of data transfer and/or addressing traffic over a storage network.

Figure 1:
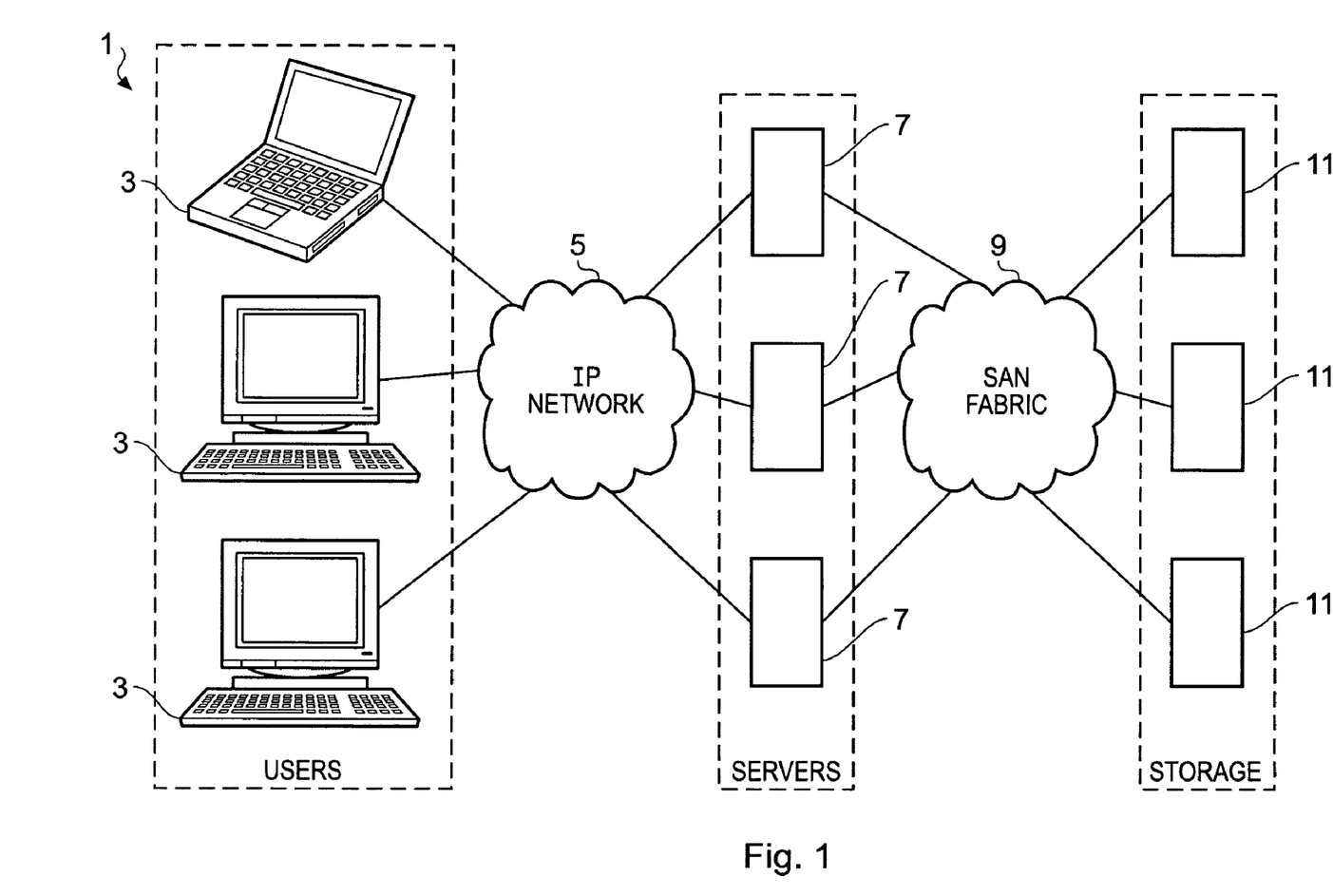
FIG. 1 is a schematic representation of a computing environment incorporating a storage area network.

FIG. 1 shows a schematic representation of a computing environment 1 in which a storage area network (SAN) is deployed. The computing environment 1 comprises a number of user terminals 3 which are connected via an IP network 3 such as an Ethernet network to a number of servers 7. The IP network 5 may include a local area network (LAN), a wide area network (WAN) or the Internet or a combination of these. Where the IP network 5 includes a non-private network such as the internet, communications between a user terminal 3 and a server 7 may take place via a secured channel such as a virtual private network (VPN).

The servers 7 are connected via a SAN fabric 9 to a number of storage devices 11. The fibrechannel fabric 9 can be scalable to accommodate hundreds of storage devices 11, each connected via the any-to-any type interconnect SAN fabric 9 to each of tens or hundreds of servers 7. The storage devices 11 may include an individual storage device such as a physical hard disk drive, tape drive or magneto-optic drive provided with suitable interface for direct connection into the SAN. The storage devices 11 may also include storage appliances including RAID (redundant array of independent disk) or JBOD (just a bunch of disks) arrays each comprising a number of independent physical hard disk drives. The storage devices may also include optical storage means such as an optical drive jukebox to provide access to optically stored data or an optical writable storage system operable to store and read information from optical storage.

Figure 2:
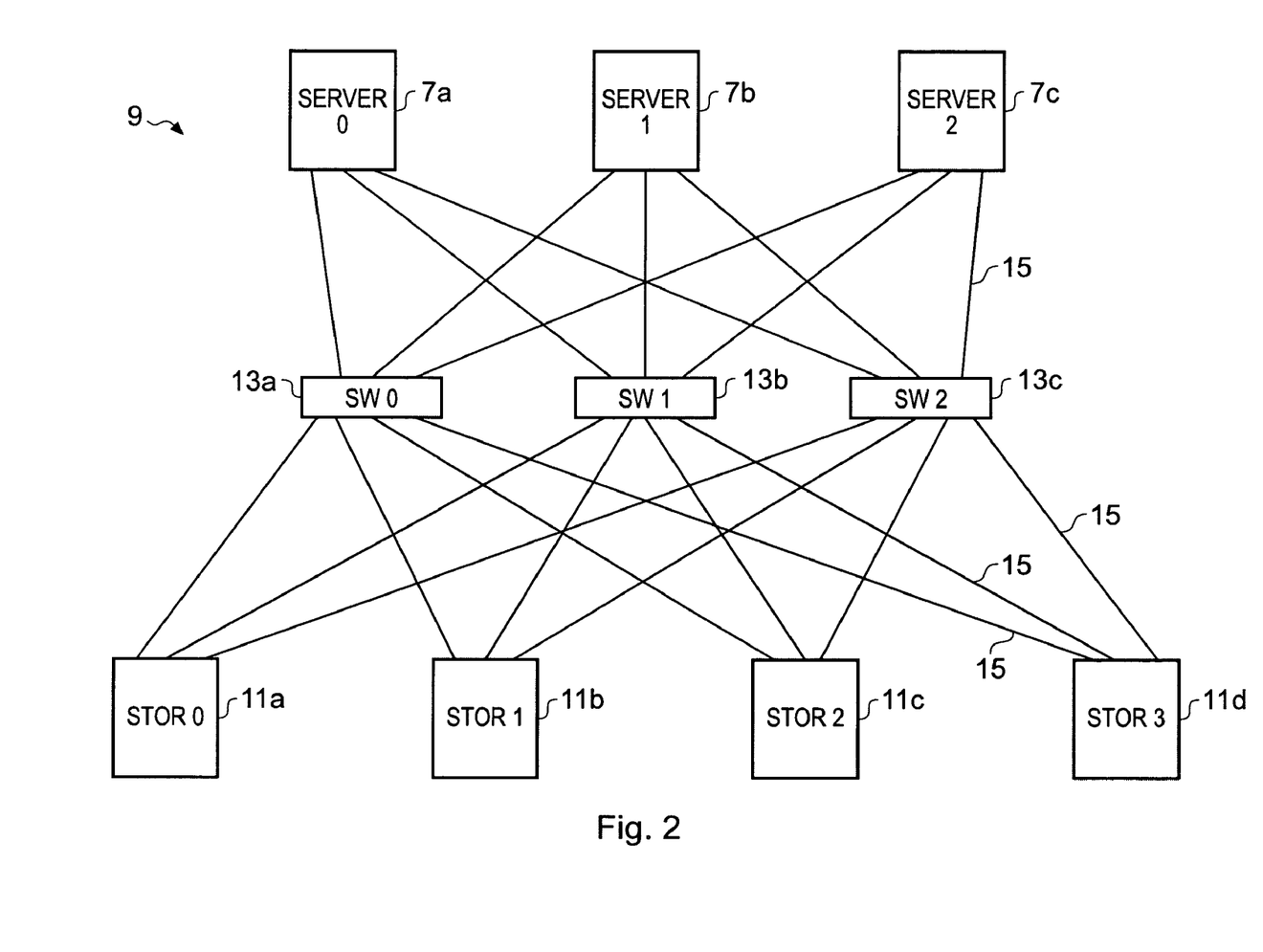
FIG. 2 is a schematic representation of a simple storage area network topology.

FIG. 2 shows a simple example of a one tier switched SAN fabric 9. The fabric 9 connects a number of servers (SERVER0, SERVER1, SERVER2) to a number of storage devices (STOR0, STOR1, STOR2, STOR3). The fabric 9 of the present example comprises a number of switches (SW0, SW1, SW2) which are connected in an any-to-any configuration between the servers 7 and the storage devices 11. Thus each of the switches 13 is connected to each of the servers 7 and to each of the storage devices 11. The connections are shown in FIG. 2 by the interconnects 15. It is therefore clear that, for example, server 7a (SERVER0) is linked to storage device 11b (STOR1) via each of the three switches 13.

The SAN can be connected based on any suitable transport protocol and associated physical interconnect. Suitable transport protocols include but are not limited to FibreChannel, InfiniBand, ATA over Ethernet (AoE) and iSCSI (Internet Small Computer System Interface).

It will be appreciated that other and more complex SAN fabrics may be used. For example, a larger number of servers and/or storage devices may be connected via the same or a larger number of switches. Further, a multi-tier fabric could be used, where more than a single tier of switches is provided, such that not every switch connects directly to a server and/or a storage devices as some switches may connect to other switches to create the multiple tiers. Also, a split and/or mirrored arrangement could be implemented with different or mirrored parts of the San being located at separate physical locations. In addition, although the connections within the fabric are denoted by single line interconnects 15, each interconnect may include more than one physical channel. Such multiple channels can be arranged in a teamed configuration for increased bandwidth or in a redundant arrangement to allow for increased reliability. In some examples, a teamed arrangement of multiple interconnects could be configured for maximum bandwidth in a healthy state and be configured to failover to a reduced number of interconnects in the event of one interconnect reaching an unhealthy state.

Within the SAN, a filesystem or other user-facing storage arrangement can be abstracted over the physical storage devices in the SAN. The physical storage can be aggregated into pools, from which the overlying logical storage is created. This arrangement is known as virtualized storage, and allows the underlying physical storage to operate on a block I/O basis rather than on a logical addressing basis (as would be the case in a non-virtualized storage system). Furthermore, this arrangement allows different storage devices from different product ranges and different vendors to be built together into a single logical storage domain or a set of logical storage domains by vitalizing that logical domain(s) over the physical storage devices.

The base physical storage unit in a virtualized storage system is a logical unit number (LUN). A LUN may be a single physical disk drive, but may also be a virtual partition or volume within a RAID set. To access a particular part of a LUN, an offset within the LUN is described using a logical block address (LBA) which points to a particular block within the LUN.

In an any-to-any type fabric arrangement such as that illustrated in FIG. 2, or in a many-to-many arrangement where not all end-nodes can reach one another (for example if a system has been at least partially split to maintain data separation between connected entities), a system of dynamic multipathing (DMP) can be used to balance I/O traffic across the fabric between a requesting server and the storage devices to improve performance and availability.

In the context of the example of FIG. 2, if SERVER1 7b initiated several I/O operations with respect to LUNs located on STOR0 11a and STOR2 11c, use of DMP would enable the operations to be balanced out between the switches and interconnects. For example, the traffic between SERVER1 and STOR0 might be routed over SW0 and SW1, and the traffic between SERVER1 and STOR2 might be routed over SW2, so as to spread the load over different switches and different interconnects to SERVER1. The skilled reader will realize that this represents a very simple example, but will appreciate that the same principle applies to more complex arrangements of fabric and traffic through the fabric.

In terms of the increased availability aspect of DMP, if SW0 were to fail, this could be recognized and all traffic routed not via SW0. Likewise, if the interconnect between SW1 and STOR3 were to fail (for example if a cable is accidentally severed or disconnected) then traffic could be routed to avoid any path that involves using the failed interconnect. Typically, a DMP system takes very little time to switch over to a non-failed path through the fabric. However, the total time for failover from a failed path is dependent upon how long the underlying storage system driver retries a particular command over a given path before giving up.

In the present examples, the DMP driver resides in a host system of the SAN. The DMP driver resides separately on each server 7a, 7b, 7c connected to the SAN. There is no need for the DMP software on one host to be aware of DMP software on other hosts. In other words, there need be no coordination between the boxes as far as DMP is concerned. Since the same software resides on all the hosts, all of them will observe a given failure condition at around the same time. The DMP driver of the present examples maintains two tables to manage the paths over the SAN. These tables are a table of LUNs identified as being part of the SAN by the host system and a table of paths to each of the LUNs in first table. The mapping from the table of LUNs to the table of paths is one to many. In other words, the mapping identifies all possible physical paths for each LUN listed in the first table. Each LUN, therefore, is presented as an abstraction that can be used as an access point to data stored within the SAN by any application. Whenever an I/O request is received at the access point, the services of DMP are invoked and DMP driver selects one of the available healthy paths for the I/O request.

In SAN systems, one form of error that is not infrequently experienced is the intermittent hardware failure. This is typified by a connection element that switches between healthy and unhealthy states. The connection element could be, for example, an intermittent or partial failure of a physical interconnect element such as a cable or PCB track or could be an intermittent or partial failure of a data handling element such as an interconnect port on a server, data storage device or switch or a routing processor of a switch. This type of error leads to repeated invocation of error handling procedures within a DMP system as the system as a whole adjusts and re-routes to take account of the flip-flopping of the element between working and faulty states. This can causes severe degradation of performance due to the delays associated with detecting whether the element is currently working or faulty, and in resending I/O traffic which is dropped by the element in its faulty state.

The system of the present examples addresses this problem by implementing an enhanced monitoring system to identify such intermittent failures. Once such intermittent failures have been identified, the system of the present examples can implement routing controls to avoid using a path involving the intermittently faulty element.

In a conventional SAN arrangement, in the context of a SCSI storage based system (the interconnect transport protocol being irrelevant, this applies equally to InfiniBand and Fibre Channel as it does to iSCSI), DMP uses a SCSI inquiry to determine the health of a path on which an I/O error has occurred. Consequently, there is a reliance on the SCSI driver to schedule the inquiry command and wait for it to complete. Thus, if there is a queue build up at the SCSI layer, the inquiry command will be delayed and consequently, the error detection from DMP will be delayed.

The error processing in the DMP system is a kernel task created at boot time in the host system to process erroneous I/O. The error processing task is normally inactive and sleeping until an I/O error is reported. When an I/O returns with an error, the erroneous I/O is put into an error queue and a signal is sent to the error processing task to wake up and to perform error analysis for the erroneous I/O. The error analysis can be specific to a physical enclosure containing the LUN on which an I/O error has occurred, if there is a vendor supplied array policy module available for it, or it can be the generic error processing of the DMP driver. The generic error processing carries out the following steps on an erroneous I/O in the queue, and, if required, repeats for every entry in the queue until the error queue is empty. First, the error processing task determines the path device number on which the error happened, and it then issues a SCSI inquiry to the path at a controller level (for example using an IOCTL context). Once the SCSI inquiry returns the status, the error processing task determines the health of the path, either dead or alive, based on the return status. If the SCSI inquiry succeeds (i.e. indicates alive), the I/O is retried on the same path to try to reach the target LUN successfully based on the error recovery option (fixed retry or time bound retry) set by the user until the I/O times out, in case of time bound retry, or the retry count for I/O, in case of fixed retry, over the fabric is exhausted. If the I/O continues to fail even after exhausting the retry count, then the error processing task determines it as a media error and fails the I/O. The path, however, is not marked bad. On the other hand, if the SCSI inquiry to the path fails, the error processing task determines it to be a path failure and re-schedules the I/O on the other available paths. The re-scheduling of I/O might result in a path fail-over for an Active-Passive (A/P) array if the failed path was the last primary path. This is because A/P arrays do not support I/O concurrently through all storage processors. Instead, the A/P arrays require that host multipathing solution use a primary storage processor as much as possible. The host system fails over to the secondary storage processor only when the access to the primary storage processor is lost. Using both the primary and secondary storage processors concurrently for an A/P array results in trespass and eventually leading to sluggish and degraded system performance. As will be appreciated, a storage device such as a disk array may include one or more two storage processors. Each storage processor can have multiple access points known as ports. Thus, a set of ports identifies a single storage processor. The storage processor is the main entity of the array and handles routing of I/O to the underlying disks. For an A/P array, it is mandatory to use only one out of a set of two or more storage processors (known as PRIMARY) via its associated ports. The other processor(s) is a standby processor (known as SECONDARY) and which is pressed into service only when the PRIMARY storage processor is not accessible through any of its ports.

If there are no available paths to the target LUN, then the error processing task marks the LUN as dead, which results in a complete loss of the blocks of that LUN to the SAN. Any I/O request from a server which targets that LUN will be returned as failed due to the unavailability of the LUN. Dead LUNs are probed by a DMP restore process.

In the present examples, the DMP driver also spawns another kernel task known as a statistics processing task which is concerned with updating the statistics of the paths participating in I/O. DMP maintains a statistics buffer for each CPU detected in the host system. Maintaining the statistics per CPU provides that validation of local cache is avoided. In other words, the performance improves as each CPU can simply work on the read-only copy of the data. If the data were to modify repeatedly, each CPU would have to re-fetch the most recent data, which re-fetch operation may in multi CPU systems be very costly. The statistics buffer is populated by each successful I/O sent by the DMP driver on participating paths. The statistics processing task wakes up periodically, typically every one second, and examines the per CPU buffer. When the buffer reaches 80% occupancy, the statistics information from the buffer is flushed to another buffer that is read by applications.

In the present examples, the error processing task uses the asynchronous SCSI interface to send its probes wherever possible. This has a number of advantages over previous error processing methods. One such advantage is that it provides for the use of concurrent error processing. Since the SCSI interface is asynchronous, the error processing need not wait for the completion of the probe and as such, can directly proceed with the error analysis of next erroneous buffer from error queue. Another such advantage is the availability of elaborate error codes from the SCSI target driver. Both these advantages improve error analysis in DMP significantly and also scale with the number of devices connected to the system.

Most conventional DMP-based SAN systems use a path restoration kernel task to handle restoration of failed paths, such as those identified as failed by the error task. Like the error processing task, the restore processing task is also a kernel task spawned by DMP kernel at system boot time in the host system. Unlike the error processing task, the restore processing task can be terminated and restarted with different parameters at any time by the system administrator. As the name suggests, the restore processing task fundamentally handles automatic restoration of the failed paths. The restore processing task is a time-based synchronous thread that is woken up when its timer is triggered. When it wakes up, it checks the health of fabric paths depending on a predetermined policy. A systems administrator is able to specify both the timer and the policy. Commonly used policies include check disabled, check all, check alternate and check periodic policies.

The restore processing task thus has an inherent disadvantage in that when a path is restored, it is available for I/O almost instantaneously. This may not be true especially in cases where there is intermittent failure on that path as a result of, for example, a loose physically connection of some kind. Such paths will generate I/O errors and so will be closed by the error processing task, however if at the time that the restore processing task retries the path there is presently no error, the restore processing task will restore the path. This creates a perpetual cycle of closing and reopening the path with an intermittent fault unless an astute administrator observes frequent path disable/enable messages and manually closes the path permanently to break the cycle, or is able to perform physical maintenance to the path to remove the intermittent failure. The problem can be mitigated if some kind of ageing is assigned for the revived paths.

In contrast, the system of the present examples gathers information about the underlying fabric elements at a more fundamental level in order to obtain greater detail relating to any given failure, so as to provide more accurate and faster handling of the intermittent failures.

In the present examples, the fabric can be monitored to observe channel statistics for each path through the fabric. These statistics are obtained directly from ports within the fabric (whether attached to a server, storage device, or switch) relating to numbers of dropped packets, high transmission errors etc. using an application programming interface (API) to talk directly to the ports. Moreover, the statistical information about all the participating paths is maintained by the DMP driver and is independent of any API which may be used by an error processing task. The DMP driver maintains statistical information on each path. The information can include number of blocks transferred, number of read and write operations, number of bytes transferred and start and end times of I/O request. In one example, the ports to be monitored have a host bus adapter (HBA) designed in accordance with standards set by the Storage Networking Industry Association (SNIA). Such SNIA HBAs are all compatible with a single API (the SNIA Common HBA API). Use of such a standard API enables the fabric to be built of mixed vendor products without concern that the monitoring would only work on products from a vendor that makes its components compatible with a proprietary API.

The port monitoring API can be used by an event source user process (ESP) which may be a dedicated daemon or may be a part of a larger single or multi-threaded process. When ever the ESP is active, it periodically collects the statistics of all the ports of all the HBAs using an API call such as HBA_GetPortStatistics in the SNIA Common HBA API. In each interval the ESD finds the fluctuations in statistics about each port. Of the statistics which are available via the SNIA Common HBA API, at least a subset of the following may be of assistance in monitoring the health of paths in the fabric: LIPCount (the number of Loop Initiation Procedure sequence events that have occurred on an arbitrated loop), NOSCount (the number of No Signal Count events that have occurred on the fabric), ErrorFrames (the number of frames containing errors), DumpedFrames (the number of frames dropped), LinkFailureCount (the number of times that the link has failed), LossOfSyncCount (the number of times that the link has lost schnchronisation), LossOfSignalCount (the number of times that the signal on the link has been lost), PrimitiveSeqProtocolErrCount (the number of errors that have occurred during a protocol validation), InvalidTxWordCount (the number of times that an invalid transmit error has occurred), InvalidCRCCount (the number of times a CRC check has returned an invalid result).

If the fluctuation in statistics crosses a threshold limit then the ESD will send a system call, such as an IOCTL, to DMP driver to mark the corresponding paths as STANDBY so that these paths will be used to send the I/O if and only if there are no alternate healthy paths available. Thus a path identified as suffering from a predetermined level of errors can be identified as unreliable and selected as a least preferred path.

Once a path has been marked as STANDBY, it can be returned to active use if the path statistics alter to a level which is considered healthy. This re-activation threshold can be set to be the same as the de-activation threshold which caused the path to be marked as STANDBY. However, in the present example, the reactivation threshold specifies a lower level of errors that the deactivation threshold. This arrangement operates to reduce the possibility of a path that operates on the margins of the deactivation threshold from flip-flopping in and out of service. Rather, according to this arrangement, a path has to show a marked improvement in performance before being reactivated—simply being good enough not to be deactivated is insufficient. In the present examples some traffic may travel over a STANDBY path. This traffic can be used to determine whether the path has recovered and should be returned to full use. The first class of such traffic is normal I/O traffic that uses the STANDBY path because no other path is available to the target LUN for the I/O. Another class is test traffic that may be generated by a path restoration task. In some examples, a path restoration task can be implemented to test STANDBY paths by sending test traffic over the path to determine whether the path is healthy again. In some examples, the path restoration task may also test failed paths to determine whether they are ready for re-opening.

Figure 3:
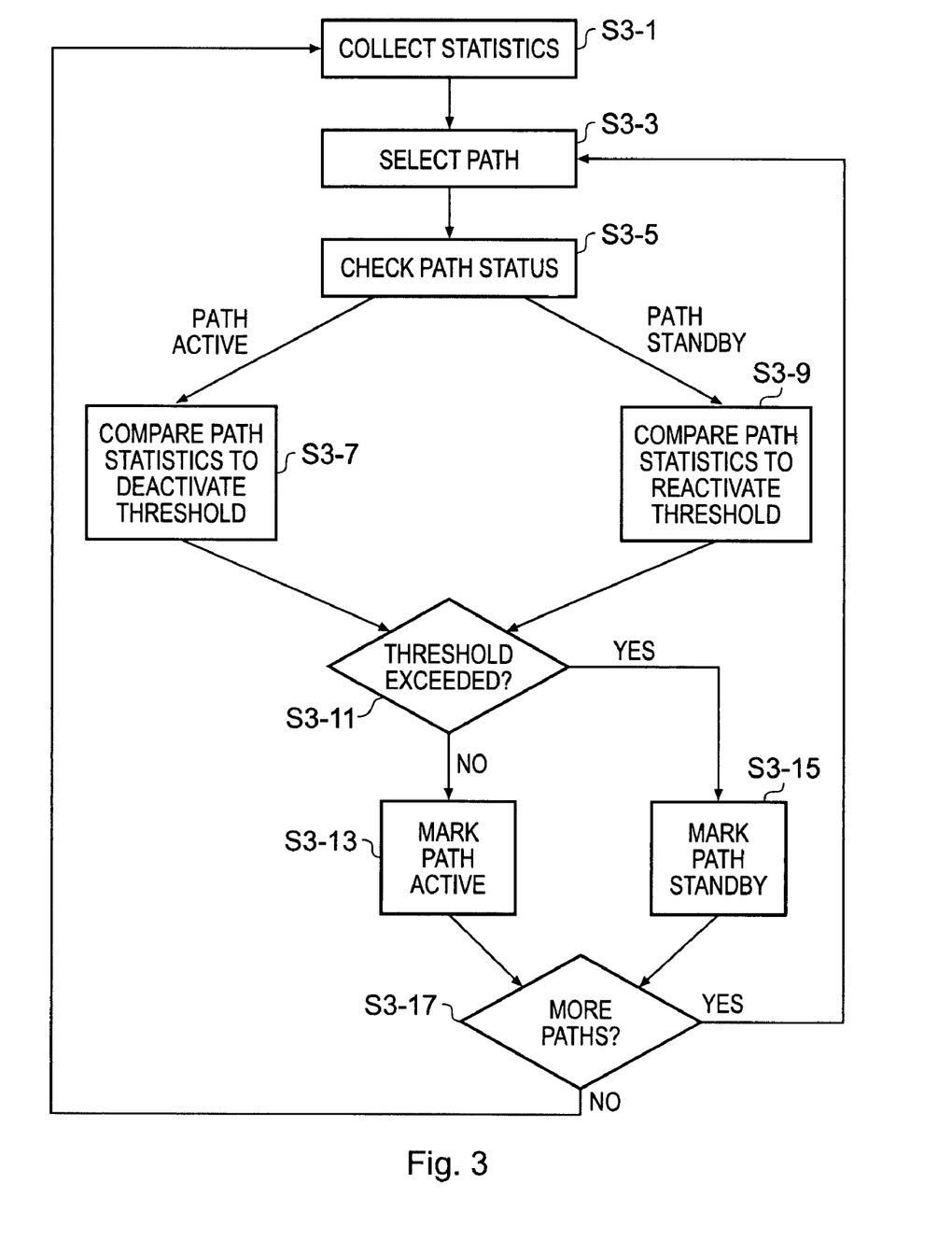
FIG. 3 is a flow diagram illustrating steps in a process for determining a path health condition.

The process for monitoring a path and making STANDBY decisions within the ESD is shown in FIG. 3. The process starts at step S3-1 with the ESD collecting path statistics. Then, at step S3-3 the ESD selects a path to consider. The selection of when and which path to consider may be made in a number of ways. Examples of selection method for picking a path to consider can include: the ESD may refer to a list of all possible paths and consider each in turn, or it may refer to a list of all possible paths and consider the next path on the list after a time delay from completion of the previous analysis of the same or a different path, or it may select a path at random from the possible paths and analyze that path before selecting a next path at random. In the event that the ESD is a multi-threaded process, the ESD could in fact consider more than one path at any one time.

Once a path has been selected, its current status is checked at step S3-5. If the path is currently active, processing continues at step S3-7 where the statistics for the path are compared to the deactivation threshold. On the other hand, if the path is currently STANDBY, processing continues at step S3-9 where the statistics for the path are compared to the reactivation threshold. Whichever threshold is used, a determination of whether the threshold has been exceeded (i.e. the error related statistics sum to be over the threshold) is made at step S3-11. If the threshold is not exceeded, the path is marked (or maintained) active at step S3-13. If the threshold is exceeded, then the path is marked (or maintained) STANDBY at step S3-15. Finally, a determination is made as to whether another path requires consideration at this time. If not then the ESD simple enters a statistics collection state (step S3-1) and if another path requires consideration at this time, the method returns to step S3-3 where the next path is selected.

In some examples, a further stage may be added to the process of re-enabling a path after failure. Under normal circumstances, once a path is marked as live, it is available for I/O almost instantaneously. This can be a problem if, for example, the path has a loose cable connection or similar which may result in repeated enable/disable of the path by the DMP kernel driver. Further, if the array is an A/P array, then repeated fail-over and fail-back operations would be expected to be triggered which can in turn be expected slow down the I/O throughput drastically.

In the present example failure statistics, such as number of times the path has failed, number of I/O failures on the path, time of last failure, time of last revival, for each path can be maintained as part of the path statistics record. Whenever a path suffers some form of failure, its failure statistics can be updated accordingly. A path having a high number of failures would therefore have high failure count values: When a path comes back online, (for example by passing the threshold test outlined above, by being manually reactivated or by some other means) in the present example the restore task does not immediately mark the path as available. Rather, the restore processing task defines an age for the path. The age includes a number of age boundaries spaced at time intervals within the age duration. The path can then be probed at each age boundary to determine its health. If at such a probing the path is discovered to be unhealthy, the path can be taken to a STANDBY or closed status. On the other hand, if at such a probing the path is found to be healthy, the path is left alone by the age checking process until the next age boundary. Finally, if the path reaches the end of the specified age having passed a health check by the probing at each age boundary, then it will be enabled for I/O. In case of A/P arrays, fail-back action will also be taken, if required.

The age can be specified per system or per path. In some examples, a default setting may be applied which can be modified on a per path basis in cases of particularly high or low failure count for a path. In one example, the age could be given a default value of 5 with age boundaries of 1, such that the restore task would probe the path 5 times, before the age completes. In one example the duration of the age boundary could be 1 minute. Thus in the example of an age of 5 with a boundary of 1, the path would be tested after 1, 2, 3, 4 and 5 minutes, with the path being marked available for I/O if all five tests are passed.

Figure 4:
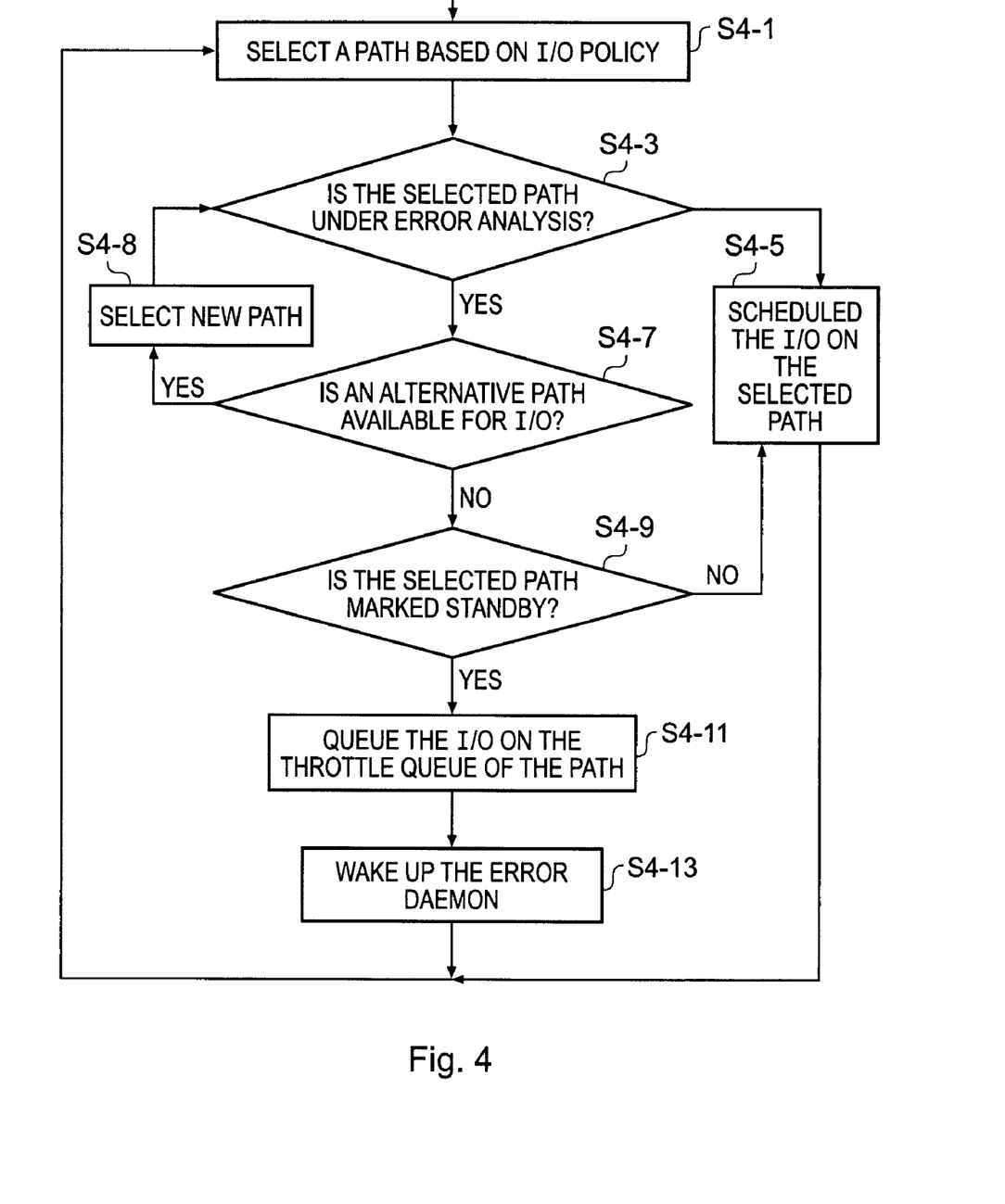
FIG. 4 is a flow diagram illustrating steps in a path selection process.

An example of how paths are selected for I/O transfer on the basis of path status is shown in FIG. 4. Firstly, at step S4-1, a path for a given I/O operation is selected based on the standard path selection policy for the SAN. This may include standard load-balancing considerations as well as relative path bandwidth considerations, for example. In the present example, this also includes a consideration of whether a path is marked as STANDBY or not. In accordance with the detailed discussion above, a STANDBY path is selected only if it is the last active path to a destination LUN.

Once a path has been selected, a check is performed at step S4-3 to determine whether the path is under error analysis at the present time. If the path is not under error analysis, the I/O is scheduled on the selected path at step S4-5 and the process loops back to consider a next I/O.

If on the other hand it is determined at step S4-3 that the path is undergoing error analysis, then processing continues at step S4-7 where a check is performed to determine whether an alternative path is available. If an alternative path is available, then that path is selected at step S4-8 and processing returns to step S4-3 for the newly selected path to be checked for ongoing error analysis. If it is found at step S4-7 that no alternative path is available, then processing continues at step S4-9 where a check is performed to determine whether the selected path is marked as THROTTLE. If the path is not marked as THROTTLE, then the I/O is scheduled on the selected path at step S4-5. If, on the other hand, the selected path is marked as THROTTLE, then processing continues at step S4-11 where the I/O is queued to the throttle queue of the THROTTLE path. The statistics processing task then examines at step S4-13 to determine whether I/O has resumed normally on the path and if so, then the statistics processing task un-throttles the path.

Any I/Os queued onto the throttle queue are released either as part of error processing or as part of statistics processing. If a previous I/O returns with an error, then error processing is carried out on the path. As a last step of error processing, the throttle queue is flushed. If a previous I/O returns to DMP successfully after some delay, then statistics processing flushes the throttle queue of the path.

Thus it can be seen that path selection for I/O can be influenced by the error handling status of a path on a number of levels so as to attempt to find the best possible route for sending an I/O over the SAN to avoid unhealthy paths without causing unnecessary delays to the I/O.

Figure 5:
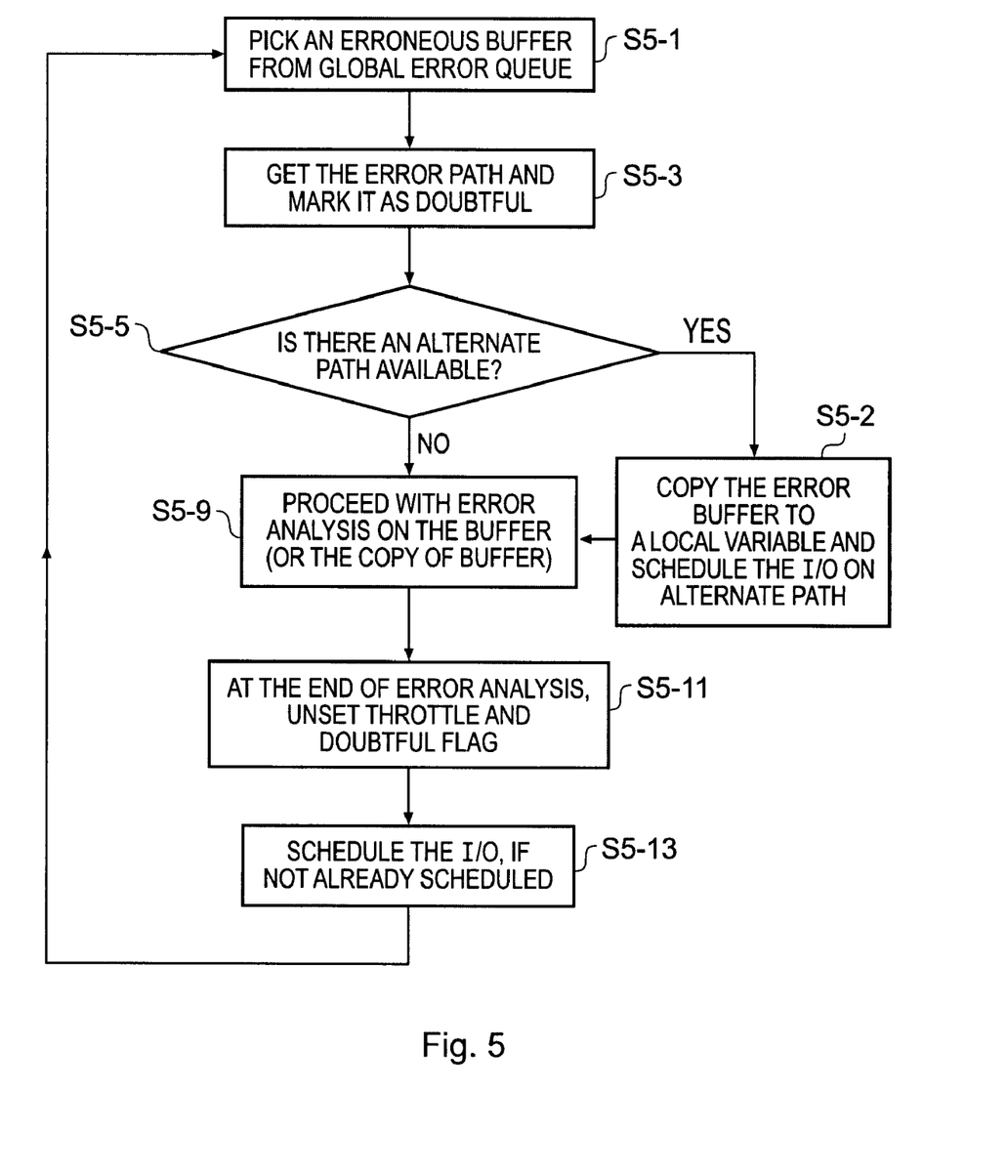
FIG. 5 is a flow diagram illustrating steps in an error handling process for a path.

FIG. 5 shows an example of how a given path is analyzed under error handling procedures following an I/O error. This is a different analysis to that conducted in the above discussion where SNIA HBA API statistics are used to preemptively detect and isolate suspect paths. The present analysis applies to paths where an I/O error has actually occurred. In the present example, as an I/O error has occurred, the system will have noticed an associated backlog occurring for the path and will have marked the path THROTTLE to reduce the traffic over that path. This process is described in greater detail below with reference to FIG. 6.

At step S5-1, an erroneous buffer is selected from the global error queue. The global error queue may be maintained by the DMP driver. The erroneous buffer is a buffered I/O that failed when being carried out on the SAN. The path upon which the I/O was traveling when the failure occurred is extracted from the erroneous buffer at step S5-3 and is marked DOUBTFUL. This indicates to an I/O scheduling process that the path should preferably be avoided as an error state is being investigated for that path. At step S5-5, a check is then performed to determine whether an alternative path is available for transmission of the I/O. If yes, processing continues at step S5-7 where the error buffer is copied to a local variable of the error handling process and the I/O is scheduled on the alternative path. This ensures that the I/O proceeds as soon as possible without waiting for the error handling to complete if another path is available. Once the I/O has been copied locally and rescheduled, or if no alternative path is available, then processing continues at step S5-9. At this step the actual error analysis is carried out to determine the health of the path. Once the error analysis is complete, the THROTTLE and DOUBTFUL flags are removed at step S5-11. This is the case whether the path is identified as healthy or failed. The I/O is then scheduled at step S5-13 if it was not previously scheduled at step S5-7 or completed as a result of the error analysis at step S5-9.

The status of the path is changed as a result of the error analysis. If the path is found to be healthy, then the THROTTLE and DOUBTFUL status is removed and the path returns to fully active status. If on the other hand, the path is found to be faulty, then the THROTTLE and DOUBTFUL status is removed and a failed status is set. Once the failed status is set, the path is considered by the restore task to determine whether the path can be restored to service. As discussed above, if the restore task decides to re-open a path, it can be marked as THROTTLE for a period of time immediately after re-opening to ensure that it is properly healthy before full use of the path recommences.

Using a system such as that outlined in the above examples, it is possible to optimize the performance characteristics of a storage area network environment.

For example, the time period between the DMP driver being notified of an I/O failure and the DMP marking a path as failed or STANDBY can be reduced to a level where the effect of the path failure on applications using the SAN is extremely limited or completely eliminated. For example, some applications such as Oracle™, have a timeout for I/O operations to complete where I/O timeout causes the application to return a failure or enter a fail state. The DMP driver of the present examples operates to keep this parameter, time to fail path, within such application timeout windows as long as another healthy path is available. This is achieved, at least in part by performing parallel analysis of all possible paths to a particular storage LUN avoiding the inherently serial SCSI inquiry commands. This analysis can be carried out by checking both previous and current path statistics collected by ESD. Furthermore, tests on alternative paths can be scheduled to test non-overlapping paths first. Thereby, the chances of a failing element within the failed path similarly causing an alternative path to fail are minimized. Thus a healthy path would be expected to be found sooner than if alternative paths are ordered to gradually reduce the amount of overlap (which is likely to pinpoint the failing element faster) or are randomly ordered. In addition, the ESD gathered statistics can be supplemented by sending SCSI commands capable of capturing SCSI sense data down the test paths. These can be performed using the synchronous IOCTL interface to retrieve the SCSI sense data, or by using the asynchronous interface mentioned above for path testing operations. The SCSI sense data can be used to help determine whether the failure is due to a failure in the storage medium or a failure in the path. In many cases, the path testing operations are I/O retry operations such that the path is tested to carry "live" requests and data and to ensure that if the path is healthy, the I/O operation is carried out as a direct result of the test.

In some circumstances, a volume manager driver may provide information indicating a form of I/O retry which may be most appropriate to the particular failure being tested.

Another performance characteristic that can be optimized by use of a system as described in the present examples, is that of time to resume I/O. This is a measure of the time between the DMP driver being notified of an I/O failure and the DMP starting I/O to the target LUN if a healthy path exists.

A further performance characteristic that can be optimized by use of a system as described in the present examples is that of path failover time. This is a measure of the time between a physical event which causes an I/O failure (e.g. a cable being dislodged) and the pending I/O items for the failed path being transferred to a healthy path.

Thus the systems of the present examples provide for a path suffering an intermittent failure to be identified and for future traffic to be directed away from the identified path. The identified path can be marked as a standby or less preferred path, thereby allowing the path to be straightforwardly returned to service following a repair, or used if no other paths to a given LUN exist.

The system of the present example can also use gathered statistics on the traffic passing over a SAN fabric to throttle traffic via parts of the fabric which are experiencing some form of reconfiguration event. The reconfiguration event could be in relation to a permanent error, in relation to an intermittent fault, or in relation to a deliberate alteration in the SAN fabric. The throttling process can reduce traffic using the parts of the fabric which are experiencing the reconfiguration event so as to avoid delays to traffic and so as to avoid overloading the unstable parts of the fabric. Once the reconfiguration event has ceased and the fabric is stable again, the afflicted parts of the fabric can be de-throttled and any healthy paths used.

The throttling process of the present examples is based on the premise that the response of ongoing I/Os, measured as the time of completion of I/O, will be slowed down whenever there are SAN reconfiguration events, and this sudden slowness can act as a trigger to throttle I/Os on affected paths until either an error is reported or the SAN is stabilized. If an error is reported, then a path can be closed or marked failed (as discussed above). If the SAN is stabilized, the delayed I/Os can resume normally and throttled I/O, if any, can be released. In the meantime, subsequent I/Os can be routed through unaffected healthy portions of SAN. Thereby an unstable portion of the SAN can be allowed time to stabilize whilst the San as a whole maintains application throughput.

If there is an I/O error, then the path can be failed and closed, or it can be marked standby so as to enable the path to be reopened once recovered or used if no other paths to a given LUN are available. If the delayed I/Os resume normally after the reconfiguration is stabilized, then the path can be un-throttled and be made available for I/O traffic.

From a high-level viewpoint, the throttling process operates as follows. The DMP driver maintains I/O statistics for each I/O that is serviced by it. The statistics information includes I/O start time, end time, size of I/O, the CPUs on which the I/O request was scheduled, pending I/Os, etc. The statistics tables can be reviewed at regular intervals to monitor the status of each path. In the present example, this is performed by a statistics task in the DMP driver that wakes up every second. The monitor process can scan the statistics tables to determine active paths, idle paths and non-responsive paths.

Categorization of paths in the present example is as follows. A path is categorized as active if it is, at the time of review, actively carrying I/O. A path is categorized as idle if it is not, at the time of review, actively carrying I/O. A path is categorized as throttled if there was I/O activity observed in the previous invocation but no I/O activity in the current invocation and there is pending I/O on the path. A throttled path is not selected for I/O unless the path is the last available path to a given LUN. Similarly, a path is un-throttled when the pending I/O returns successfully or an I/O is reported.

In the present example, the statistics used to categorize a path as throttled does not include statistics derived from the SCSI driver. In some examples, the throttling analysis may be based on the number of outstanding I/O in the SCSI driver with the statistics from the SNIA HBA API being used to determine the health status of a path which has been characterized as throttled.

As part of normal I/O, the DMP driver maintains elaborate statistical information for each I/O on each paths in the SAN. Additionally, each path will have an associated throttle queue. The throttle queues will begin to fill up when the response of a path slows down and when there are no alternate paths available for I/O. The statistics information will contain the start and end times of each I/O operation per CPU in the system per path.

A decision on whether a given I/O should be transferred to the throttle queue can be based on the number of outstanding I/Os on that path (queue-depth based) or the time of the last successful I/O on that path (time-based). In the resent example, the statistics processing task can examine the pending I/O count and/or time of completion of last successful I/O to facilitate this decision.

In the present examples, the DMP driver will define throttling based on either or both of the above two criteria. There will be two throttling options—time-based and queue depth based. If the response of a path has slowed down, the number of outstanding I/Os on the path will increase. Consequently, the time difference between the current I/O and the last successful I/O will also increase, triggering throttling logic and inhibiting newer I/Os from being scheduled to the throttled paths. The throttle queue will be unblocked as soon as the error analysis on that path is completed or an I/O returns with success. In the present example this approach is independent of the SCSI/HBA based monitoring of parameters and is based solely on the statistical information available with DMP driver. In other examples, the two data sets may be combined to perform this.

A decision on when/whether to trigger the throttling logic for a given path is the responsibility in the present examples of a statistics processing task. The statistics processing task can be configured to wake up periodically to determine whether to throttle a path based on a throttling policy set on any individual element within the SAN, such as a parent enclosure for a disk array connected to the system. In the present example, the statistics processing task may be configured to wake up approximately once per second. The DMP UI can provide a facility to an administrator to set the throttling policy.

In the case of time-based throttling, the DMP statistics processing task will trigger throttling when an I/O has not completed within a predetermined timeout period. With queue-depth based throttling, the trigger will happen when the DMP statistics processing task finds that the number of outstanding I/Os on a path has exceeded a predetermined queue threshold. In both cases, as soon as the statistics task decides to throttle a path, it will be marked as THROTTLE. If there is an alternate path available, then I/Os on the throttled path will be scheduled on the alternate available paths. The throttle queue for the THROTTLE path will build up only if there are no alternative paths available for I/Os. When a pending I/O completes successfully, the statistics processing task will flush the throttle queue. When a pending I/O returns with an error, the error processing task will flush the queued I/Os from throttle queue.

Whenever a path is chosen for error analysis, it will in the present examples be marked with an intermediate state such as DOUBTFUL, to prevent new I/Os from being scheduled to that path. As discussed above, such I/Os will be queued on the throttle queue that will be unblocked once error analysis is complete on the path or when an I/O returns successfully on that path. Other erroneous I/Os, which were on error queue before the path was marked DOUBTFUL, can be added to the head of the throttle queue.

Figure 6:
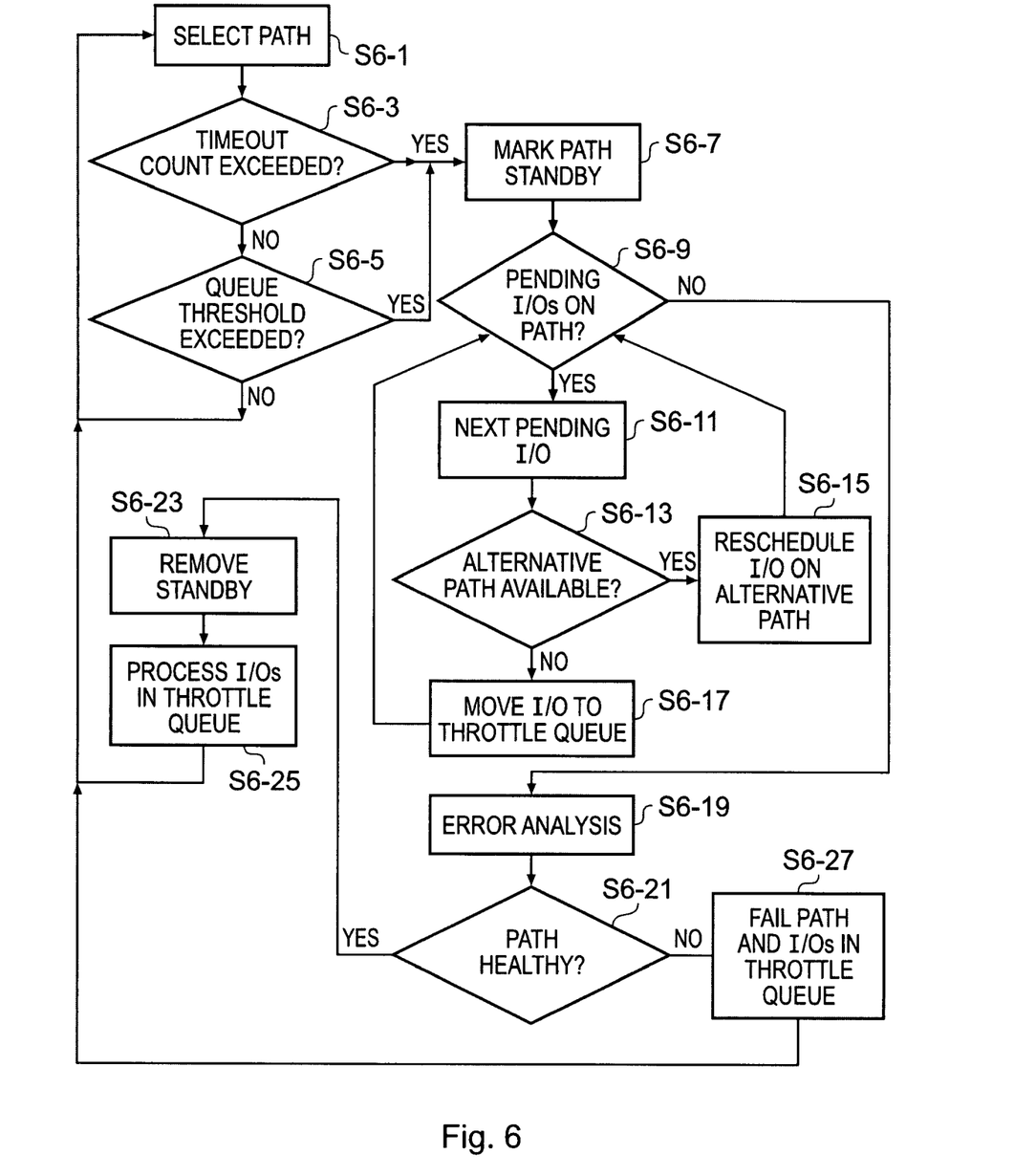
FIG. 6 is a flow diagram illustrating steps in a throttling process for a path.

This process is illustrated in FIG. 6. The example illustrated in FIG. 6 assumes a single-threaded process. If the process(es) controlling the steps are multi-threaded, then more than one path may be analyzed at any time, and/or certain steps may be performed in parallel.

The process starts with a path being selected for analysis at step S6-1. Next, at step S6-3 a check is performed to determine whether a timeout count has been exceeded. If not, processing continues at step S6-5 where a check is performed to determine whether a queue threshold has been exceeded. If not, the path is fine and a next path can be selected (step S6-1).

On the other hand, if it determined at step S6-3 or S6-5 that the relevant timeout count or queue threshold has been exceeded, the processing continues at step S6-7 where the path is marked as THROTTLE. This marking of the path as THROTTLE causes the path to be throttled as it strongly discourages any further I/Os from being scheduled to that path.

Once the path has been marked THROTTLE, a check is performed at step S6-9 to determine whether there are any I/Os pending on the path. If there are I/O's pending on the path, the at step S6-11 a next pending I/O is selected and at step S6-13 a check is performed to determine whether an alternative path is available for that I/O. If an alternative path is available, the I/O is rescheduled to the alternative path at step S6-15 and if no alternative path is available, the I/O is moved to the throttle queue of the path at step S6-17. Once the I/O has been rescheduled or moved as appropriate, the process returns to step S6-9 to determine whether any more I/Os remain scheduled to the path. If any more I/Os are scheduled to the path, then steps S6-11, S6-13, S6-15 and S6-17 are repeated. Once no more I/Os remain scheduled to the path, processing continues at step S6-19 where error analysis of the path is carried out. This error analysis can include steps discussed above in relation to FIG. 5. Once the path health analysis is completed, a check is performed at step S6-21 to determine whether the path is healthy.

If the path is healthy, processing continues at step S6-23 where the THROTTLE status is removed, subsequent to which any I/Os in the throttle queue are processed. The processing of that path is then complete and the process can return to step S6-1 and select another path. If, on the other hand, the path is determined at step S6-21 to be unhealthy, then processing continues at step S6-27 where the path is failed and any I/Os in the throttle queue are also failed, it having previously been determined that no alternative path for those I/Os exists. The failing of the path could result in the path being identified as completely failed such that the restore task can consider whether to try to restore the path, or may be marked STANDBY. Following step S6-27, processing of the path is complete and the process can return to step S6-1 and select another path.

Thus it can be seen that a throttling process can be implemented based on one or more of a timeout condition and a queue backlog condition to allow a path to be cleared if unexpected slowness occurs. This provides a healthy path with an opportunity to recover and allows a failing path to be identified as early as possible.

Many alterations, modifications and additions and their equivalents to the described examples will be apparent to the skilled reader of this specification and may be implemented without departing from the spirit and scope of the present invention.

The invention claimed is:

1. A method for controlling data traffic in a storage area network, the method comprising:
    a computer system storing one or more tables identifying a plurality of paths between the computer system and a logical storage unit in the storage area network;
    the computer system analyzing a first set of one or more statistics of a first path of the plurality of paths;

in response to the first set of statistics satisfying a first threshold:
the computer system storing a first indication in the one or more tables, wherein the first indication identifies the first path as being a less preferred path;
the computer system reducing I/O traffic provided to the logical storage unit via the first path;
the computer system increasing I/O traffic provided to the logical storage unit via a second path of the plurality of paths;
after reducing the I/O traffic provided to the logical storage unit via the first path for a predetermined time period, the computer system initiating a restoration process, including analyzing a second set of one or more statistics of the first path by generating test traffic and transmitting the test traffic to the logical storage unit via the first path;
in response to the second set of statistics satisfying a second threshold:
the computer system storing a second indication in the one or more tables, wherein the second indication identifies the first path as being a preferred path;
the computer system increasing I/O traffic provided to the logical storage unit via the first path.

2. The method of claim 1, wherein satisfying the second threshold includes determining that a time for completing an I/O request is below a predetermined amount of time.

3. The method of claim 1, wherein satisfying the second threshold includes determining that a number of outstanding I/O requests is below a predetermined queue threshold.

4. The method of claim 1, wherein the test traffic is transmitted using FibreChannel, InfiniBand, ATA over Ethernet (AoE), or iSCSI (Internet Small Computer System Interface).

5. The method of claim 1, wherein increasing the I/O traffic provided to the storage device via the second path includes rescheduling pending I/O requests provided via the first path for transmission via the second path.

6. The method of claim 1, wherein satisfying the second threshold includes determining that a level of detected errors is below a predetermined error threshold.

7. The method of claim 1, wherein the first and second thresholds are the same.

8. The method of claim 1, wherein the first and second threshold are different from one another.

9. The method of claim 1, wherein the first and second sets of statistics include one or more of the following statistics: a start time of an I/O request, an end time of an I/O request, a size of an I/O request, or a number of outstanding I/O requests.

10. The method of claim 1, wherein the logical storage unit is a logical unit number (LUN).

11. A computing system comprising:
one or more processors;
memory storing program instructions executable by the one or more processors to:
store information identifying a plurality of paths between the computer system and a logical storage unit in a storage area network;
analyze a first set of one or more statistics of a first path of a plurality of paths;
in response to the first set of statistics satisfying a first threshold:
indicate in the stored information that the first path is a less preferred path;
reduce I/O traffic provided to the logical storage unit via the first path;
increase I/O traffic provided to the logical storage unit via a second path of the plurality of paths;
after reducing the I/O traffic provided to the logical storage unit via the first path for a predetermined time period, initiate a restoration process, including analyzing a second set of one or more statistics of the first path by generating test traffic and transmitting the test traffic to the logical storage unit via the first path;
in response to the second set of statistics satisfying a second threshold:
indicate in the stored information that the first path is a preferred path; and
increase I/O traffic provided to the logical storage unit via the first path.

12. The computing system of claim 11, wherein satisfying the second threshold includes determining that a time for completing an I/O request is below a predetermined timeout threshold.

13. The computing system of claim 11, wherein satisfying the second threshold includes determining that a level of detected errors is below a predetermined error threshold.

14. The computing system of claim 11, wherein satisfying the second threshold includes determining that a number of pending I/O requests is below a predetermined queue threshold.

15. The computing system of claim 11, wherein the first and second thresholds are.

16. The computer system of claim 11, wherein the first and second threshold are different from one another.

17. The computer system of claim 11, wherein the first and second sets of statistics include one or more of the following statistics: a start time of an I/O request, an end time of an I/O request, a size of an I/O request, or a number of outstanding I/O requests.

18. The computer system of claim 11, wherein the first and second sets of statistics include information obtained from one or more switches along the first path, and wherein the obtained information includes a number of dropped packets or a number of transmission errors.

19. The computer system of claim 11, wherein the restoration process is configured to transmit the test traffic using FibreChannel, InfiniBand, ATA over Ethernet (AoE), or iSCSI (Internet Small Computer System Interface).

20. The computer system of claim 11, wherein the restoration process is configured to generate the test traffic and transmit the test traffic until the second set of statistics has satisfied the second threshold for at least a predetermined time period.

* * * * *

UNITED STATES PATENT AND TRADEMARK OFFICE
CERTIFICATE OF CORRECTION

| | |
|---|---|
| PATENT NO. | : 7,668,981 B1 |
| APPLICATION NO. | : 11/729178 |
| DATED | : February 23, 2010 |
| INVENTOR(S) | : Venkata Sreenivasa Rao Nagineni et al. |

It is certified that error appears in the above-identified patent and that said Letters Patent is hereby corrected as shown below:

In the Claims:

Claim 15, col. 18, line 34, please change the claim as follows:

15. The computing system of claim 11, wherein the first and second thresholds are the same.

Signed and Sealed this

Twenty-fifth Day of May, 2010

David J. Kappos
*Director of the United States Patent and Trademark Office*